Dec. 1, 1931.  H. H. SHELDON  1,834,905
SYSTEM AND APPARATUS FOR COMPARING LIGHT INTENSITIES
Filed Oct. 28, 1929
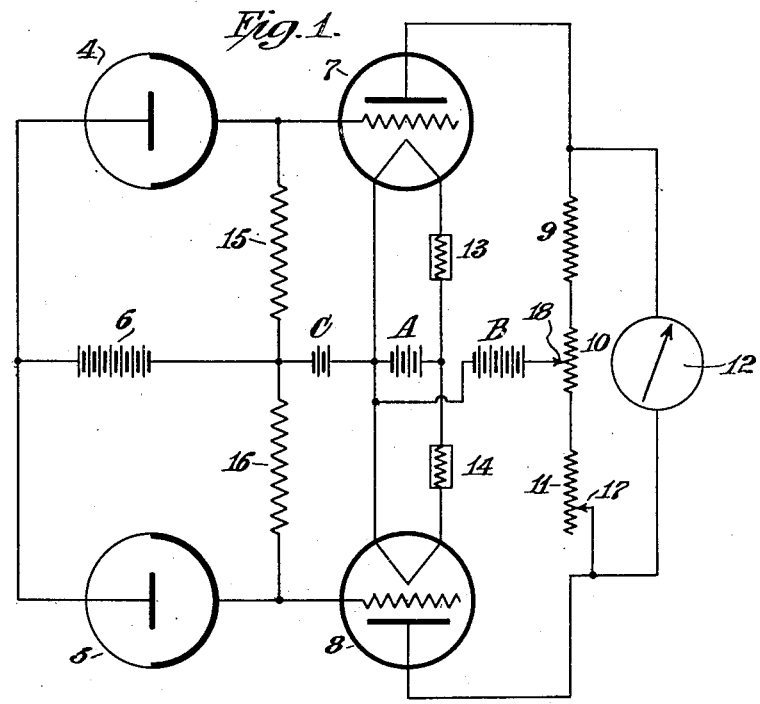
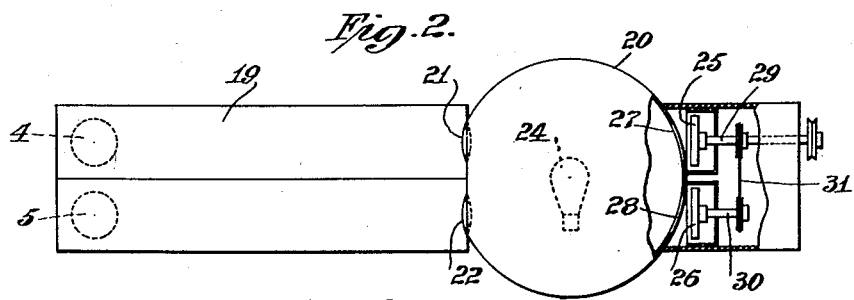
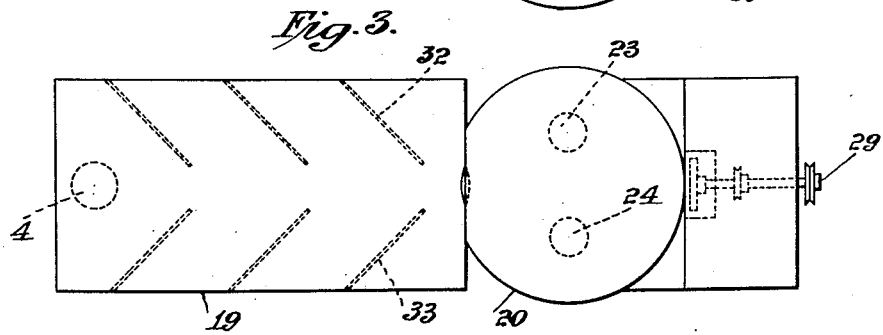
Harold H. Sheldon
INVENTOR Patented Dec. 1, 1931

1,834,905

UNITED STATES PATENT OFFICE

HAROLD H. SHELDON, OF YONKERS, NEW YORK, ASSIGNOR TO SHELDON ELECTRIC CORPORATION, OF NEW YORK, N. Y., A CORPORATION OF NEW YORK

SYSTEM AND APPARATUS FOR COMPARING LIGHT INTENSITIES

Application filed October 28, 1929. Serial No. 403,106.

My invention relates particularly to the comparison of colors as to differences in shade; for instance, to determine which of two samples of either solids or liquids is the brighter or darker or which has a greater sheen in the case, for instance, of fabrics.

The main object is to provide a sensitive and yet rapid method of comparison which can be readily applied.

Another object is to provide a system of this character in which various materials may be readily compared with standard materials.

Also forms of the apparatus may be adapted to the comparison of illuminated surfaces, comparison of dyes in solution, the comparison of oils as to clarity, the comparison of colored textiles, and in general to the accurate comparison of any two similar light intensities or colors.

By this system also materials may be matched with standards and in fact within limits calibration curves with respect to light intensities, reflection or transmission may be determined.

In its present form the apparatus employs what is commonly termed photo-electric cells which when exposed to light under proper operating conditions liberate negatively charged particles. These when made to flow through such a cell constitute or produce an electric current. The amount of current is known to be a direct function of the intensity of light falling on the cell.

If we employ two equivalent cells and subject them to two samples of light to be compared, we may readily indicate differences or equality of intensity as shown by the strength of current flowing through the respective cells. If we use two cells or circuits which have identical values and they behave exactly alike when the cells are excited by light from two sources at equal distances from the cells, we will know that the two intensities are the same. In practice it is difficult to obtain circuits and cells which will be identical but by a proper design of circuit and apparatus the respective cells and circuits may be balanced initially and thus made capable of accurately comparing two samples.

In the drawings I have shown one circuit arrangement and one form of apparatus but it should be understood that modifications may be made not only of the circuit but in the mechanical arrangement of the apparatus, for example, the broad invention may have specific uses which will be mentioned hereinafter.

Fig. 1 is a diagram of one form of circuit utilizing my invention.

Fig. 2 is a diagrammatic side view of one form of apparatus for comparing samples by reflected light and which may conveniently be termed a "comparator."

Fig. 3 is a diagrammatic plane view of the same apparatus.

4 and 5 indicate symbolically two so-called photo-electric cells sensitive to light.

6 indicates a source of polarizing voltage for the two cells.

7 and 8 are two amplifying vacuum tubes having their grids connected to the output for the respective cells. The plate impedances of these two tubes constitute in effect two arms of a Wheatstone bridge. The resistances 9, 10, and 11 constitute the other part of the arms of the bridge. The indicating meter 12 is thus seen to be connected between the pairs of arms of the bridge. The impedances of the plate circuits of the two tubes and of the resistances, when equalized or balanced, will produce zero current indicated by the meter 12. The tubes are provided with a filament battery "A", a plate battery "B" and a grid battery device such as battery "C". Obviously by the term "battery" I intend to include any suitable source of electromotive force.

13 and 14 indicate resistors which may be employed when necessary to properly limit the filament current.

Grid resistors 15 and 16 in conjunction with battery "C" serve to keep the grids at a proper potential with respect to their respective filaments.

When the set is properly designed one can subject the two cells 5 and 4 to identical light intensities and the galvanometer 12 will show no difference in the two branches of the circuit, as indicated by zero response.

That is, the galvanometer will stand at zero. If when the apparatus is first under identical conditions of illumination of the two cells the galvanometer needle does not point to zero, the two branches of the bridge may be balanced by adjusting the connections 17 and 18. In this case the adjustment of resistance 11 takes care of larger differences and therefore constitutes a coarse or approximate adjustment; whereas the adjustment 18 may be used as a fine adjustment for final balance.

If now we subject the two cells 4 and 5 to light from two samples to be compared and the meter indicator remains at zero, we may assume that the light intensity reflected from or transmitted through to the two samples is identical. The movement of the needle from the zero position indicates that one sample is brighter than the other.

The meter may be calibrated according to any desired units, so that differences in light intensity may be directly read in such units. In a properly balanced circuit the meter can deflect in one direction to indicate greater light intensity and deflect in the other direction to indicate a lesser light intensity with respect to a given standard.

In an operative meter built for the comparison of fabrics the battery 6 furnished about 90 volts and the resistances 15 and 16 were each approximately two megohms. The tubes 7 and 8 were standard amplifying tubes and the batteries A, B and C appropriate therefor.

In the apparatus illustrated in Figs. 2 and 3 the cells 4 and 5 are located in simple compartments in a box 19, the interior of which is as near dead black as possible.

The source of light is contained within a spherical chamber 20, the interior of which is finished for producing maximum diffusion through lenses 21 and 22 opposite the cells 4 and 5 respectively. The light may be produced by one or more lamps 23 and 24.

The samples to be compared are mounted in any suitable manner and the holders 25 and 26 arranged behind openings 27 and 28 in the rear wall of the sphere 20 substantially in line with the lenses 21 and 22 respectively.

It will thus be seen that both samples are subject to identical light intensity and that the light reflected from the two samples will depend upon their respective color and reflective capacity so that the cells 4 and 5 will be activated by degrees of intensity comparable to the characteristics of the two samples.

Some material, such for instance as woven fabrics, vary greatly in their respective quality, depending upon the angle of reflection. To avoid any possible difference due to the angle of reflection I propose to revolve both samples on the holders 25 and 26. For this purpose the holders are rotatable, mounted on shafts 29 and 30 connected by a crossed belt 31. Rotation of the shaft 29 therefore produces the opposite rotation of the shaft 30 and consequently the two samples are rotated the opposite direction and thus produce the effect of an average reflective value of each sample and eliminate differences in the result which might otherwise be indicated were the samples compared when stationary.

In order to cut out any side reflection from the box 19, I may provide light baffles 32 and 33, so that any side light reflection in the box is deflected away from the center of the box and thus prevents it from reaching the light sensitive cells.

When comparing liquids with respect to their transparency or translucency they will be mounted of course between the sources of light and the cells so that the light may pass through them.

The foregoing invention is susceptible of embodiment in many variations and adaptations for many commercial problems, not only for comparing fabrics supposed to be of the same shades but for testing fabrics as to sheen or gloss or finish.

By such apparatus liquids, such as oils, may be compared with standards and thus avoid errors due to the judgment of the human eye.

It is also possible by such apparatus to measure differences where changes in temperature, changes in the color of the heated object; for instance, in the process of tempering metal. Temperatures of lamp filaments may in this way be compared. It is even possible to compare metal stampings where variations in shape would produce a difference of angle of reflection.

Such apparatus may also be employed in comparing pages of printed matter with respect to the color or gloss or finish of the paper or the ink.

Differences of color of various other items of merchandise may also be automatically detected as for instance in the color of beans, poker chips, etc.

Such a system may also be employed as a primary means for actuating other devices when changes occur with respect to light reflection or transmission; for instance, a pilot flame might be used in an industrial plant and the light from this flame might be utilized to actuate one of the cells so that when the flame goes out a warning would be given or in fact an automatic re-lighting device might be actuated by the movement of the meter indicator.

By such comparative apparatus the presence of foreign particles on a fabric may be readily detected because of the changes in the reflective capacity of the fabric; so also imperfections may be detected in a standard fabric such as minute holes or tears, etc. in the material.

It is possible by the use of such apparatus to automatically control the baking of bread so as to produce loaves of a given or uniform brownness. In such case the temperature of the oven and the actuation of the burners may be controlled by the changes in color of the commodity being baked.

Obviously coating compounds may be compared by smearing or coating the holders of the apparatus with the desired component for the purpose of detecting color differences.

It is possible by such apparatus to determine the difference in area between two openings, in which case of course the plates or cards would be interposed between the source of light and the sensitive cells and the amount of light passing through the openings will depend on the sizes of the respective openings.

It is also possible to detect changes in lighting conditions, either due to variations in the source of light or conditions in a room.

Automatic signal devices may be actuated by such apparatus where the cells would be subject respectively to a standard of light and to some other light changing in direction, location or distance for the purpose, for instance, of detecting the movement of lighted vehicles.

It should be understood that any suitable form of light-sensitive cell may be employed in my invention and that the cell may be actuated either by direct or reflected light.

I reserve the right to claim in other applications special commercial applications of the invention as herein indicated.

What I claim is:

1. A light comparator comprising two light-sensitive cells, amplifying tubes connected to the output of said cells, the plate impedances constituting two arms of a bridge, external resistances constituting two other arms of a bridge, an indicating device connected between the pairs of arms, and a current supply for said cells and tubes.

2. A light comparator comprising two light-sensitive cells with polarizing means, amplifying tubes connected to the output of said cells, the plate impedances constituting two arms of a bridge, external resistances constituting the two other arms of the bridge, an indicating device connected between the pairs of arms, a source of filament current for the tubes, a source of plate current adjustable to said resistances and means for establishing a grid bias on the tubes.

3. A light comparator comprising light-sensitive cells, a spherical light reflecting chamber having lenses arranged in line with said cells and sample holders located in line with said lenses and under the influence of the light within said chamber.

4. A light comparator comprising light-sensitive cells, a spherical light reflecting chamber having lenses arranged in line with said cells and rotatably mounted sample holders located in line with said lenses and under the influence of the light within said chamber.

5. A light comparator comprising a pair of light-sensitive cells, a source of light and two separately rotary sample holders for reflecting light respectively on said cells and an indicating device connected to the output of said cells.

6. A light comparator comprising a pair of light-sensitive cells, a source of light and two separate sample holders rotatable with respect to said cells and an indicating device connected to the output of said cells.

7. A light comparator comprising two light-sensitive cells, a circuit connected therewith and including an indicating device, two rotatably mounted sample holding devices, means for rotating said sample holders, and a common source of light for affecting said sample holders.

8. A light comparator comprising two light-sensitive cells, a circuit connected therewith and including an indicating device, two rotatably mounted sample holding devices, means for rotating said sample holders in opposite directions, and a common source of light for affecting said sample holders.

9. Electrical means for the comparison of two substantially steady light sources including two light sensitive cells exposed respectively to each of said sources, resistance means for coupling said cells, a pair of vacuum tube amplifiers with their inputs coupled to said light sensitive cells, and an indicating device resistively coupled to the output of said vacuum tube amplifiers, all of said light sensitive cells, coupling means, vacuum tube and indicating device being responsive to substantially steady light excitation and electrical currents.

10. Electrical means for comparing light intensities of substantially steady value, including two photo-electric cells exposed respectively to the light intensities to be compared, two balanced vacuum tube amplifiers, two resistors coupling said photo-electric cells to the input circuits of said amplifiers, a common means for maintaining the input circuits of said amplifiers substantially opaque to direct currents, means for supplying electrical energy to said photo-electric cells, means for activating the cathodes of said vacuum tube amplifiers, means for supplying current to the anodes of said amplifiers, means for indicating unbalanced direct current, and resistance coupling means for coupling said indicating means to said anode circuits.

HAROLD HORTON SHELDON.